United States Patent Office 3,481,780
Patented Dec. 2, 1969

3,481,780
PROCESS FOR THE DENSIFICATION
OF ZIRCONIA
Stephan P. Mitoff, Elnora, N.Y., assignor to General
Electric Company, a corporation of New York
No Drawing. Filed Dec. 1, 1966, Ser. No. 598,230
Int. Cl. C23b 5/64; B44d 1/34
U.S. Cl. 117—215                                    7 Claims

ABSTRACT OF THE DISCLOSURE

The resistance of solid oxygen-ion material to gas penetration is maximized by the application of concentrated iron chloride over a porous body of the oxygen-ion material, drying of the coating and then firing of the coated material at a temperature as low as about 1300° C. in a mildly reducing atmosphere sufficiently oxidizing to convert the iron chloride to iron oxide (FeO).

---

This improvement has particular applicability in fuel cells operable at high temperatures in the range of 1000° C. to 1200° C., such as are shown in U.S. Letters Patent 3,138,487 and 3,138,490 assigned to the assignee of the instant application. Such fuel cells employ a solid oxygen-ion electrolyte, solid electrodes, fuel and oxygen supplies for the respective electrodes, and electrical leads connected to the respective electrodes.

These fuel cells, which generate low voltage direct current power on a continuous basis, have application in various chemical process industries, such as in the manufacture of aluminum and in the electro-refining of copper. In addition, the cells can be employed to operate direct current motors.

One of the problems faced in the use of solid oxygen-ion electrolytes is that of the passage of gas through the electrolyte material. By minimizing such gas penetration, the operating efficiency of the cell is increased. A solid oxygen-ion electrolyte containing integrally therewith a minor proportion of iron oxide is disclosed in application Ser. No. 412,158, Mitoff (now U.S. Patent No. 3,404,039), filed Nov. 18, 1964, and assigned to the assignee of this invention. This modified solid oxygen-ion electrolyte permits minimal gas passage therethrough and provides an essentially ionic conductor.

It is a prime object of this invention to provide another materially different process whereby the resistance to gas penetration of a solid oxygen-ion material is greatly increased.

This and other objects, features and advantages of this invention will be better understood from the following description, wherein iron chloride is applied to the porous surface of a solid oxygen-ion material, which is then heated in a selected atmosphere to effect controlled oxidation of the iron produced upon decomposition of the iron chloride.

Zirconium oxide, a well-known solid oxygen-ion electrolyte for high temperature fuel cells, can be made impervious to gases by firing a pressed, cast, or sprayed compact thereof to a temperature between about 1700° C. and 1900° C. without the use of additives. However, it is always desirable, of course, to be able to produce this condition by firing to temperatures below 1700° C. This is particularly true in those cases in which the solid oxygen-ion material has been preformed as a composite with a metal electrode, which may for example cover one major surface thereof. It may be impossible to fire such composites in the 1700°–1900° C. range without destroying the composite itself.

Solid stabilized zirconia, which is a solid oxygen-ion electrolyte material, is a compound with a cubic crystal structure consisting of zirconia to which is added calcium oxide, yttrium oxide, scandium oxide, rare earth oxides, or mixtures of these oxides. For example, the preferred solid zirconia material is stabilized with 11 molecular percent calcium oxide. Other stabilized zirconias, which may also be employed in the solid stabilized zirconia electrolyte, are discussed in "Oxide Ceramics" by Ryshkewitch, Academic Press, 1960, particularly on pages 354, 364 and 376 thereof.

By way of example, a composite tube consisting of a porous nickel inner tube having an outer zirconia layer plasma-sprayed thereon (designed to function as a fuel cell anode and electrolyte, respectively) was fired at a maximum temperature (1400° C. in a hydrogen atmosphere) below the melting point of nickel for 10 hours and was still found to be excessively porous.

However, it was discovered that a body of solid oxygen-ion material can be made impervious to gas without exceeding 1400° C. by painting concentrated (saturated aqueous solution) iron chloride over the porous surface of the body and allowing the solution to dry; repeating this process at least one more time, and then firing the body for a period of time, preferably about 10 to 20 hours, at a temperature (at or near atmospheric pressure) in the range of from about 1300° C. to about 1400° C. in a reducing atmosphere having a controlled oxygen partial pressure such that FeO is the only stable relationship for the iron as it is produced during the decomposition of the iron chloride, as it takes place. A carbon monoxide-carbon idoxide mixture or a hydrogen-water vapor mixture are illustrative of suitable atmospheres. The object is to establish a controlled atmosphere in which FeO rather than Fe or $Fe_2O_3$ is stable. Neither metallic iron no $Fe^{3+}$ will induce densification of the zirconia. Selection of the proper atmosphere is readily accomplished by reference to the graph on page 349 of "Physical Chemistry of Metals," Darken and Gurry (McGraw-Hill 1953) and the accompanying discussion on the thermodynamics of metal-oxide systems.

The proper gas compositions for any number of reducing atmospheres for providing a controlled oxygen partial pressure may, of course, be calculated using basic laws of thermodynamics and relying on the aforementioned graph solely to obtain for these calculations the values of free energy at the operating temperature for the reactions of interest ($4Fe_3O_4+O_2 \rightleftarrows 6Fe_2O_3$ and $2Fe+O_2 \rightleftarrows 2FeO$). Values of the free energy of formation for the oxides under consideration may be obtained from other sources, but the aforementioned graph is particularly convenient. If the limiting values for $H_2/H_2O$ vapor or $CO/CO_2$ gas compositions are desired, these may be directly determined from the Darken and Gurry graph from the RT In $p_{O_2}$ curves for the above-mentioned reactions displayed therein knowing the operating temperature to be employed. In this way the iron chloride is oxidized to produce the particular form of iron oxide desired and sufficient densification of the zirconia layer occurred for this material to be considered completely suitable for fuel cell uses.

The necessity for the use of a reducing atmosphere with a controlled oxygen patrial pressure for preventing $Fe_2O_3$ formation was established by impregnating the outside surface of porous stabilized zirconia with concentrated iron chloride solution in the manner described above. The body treated in this manner was fired in air for about 10 hours at about 1450° C. Although a small increase in densification occurred, the change was insignificant as compared to the densification produced by heating at about 1450° C. in a flowing carbon monoxide-carbon dioxide atmosphere. Apparently, the atmosphere employed for the firing must have a balanced reducing-oxidizing capacity such that $Fe^{2+}$ ions are the stable form. It is theorized that these particular iron ions act as a flux serving to close the open pores of the zirconia layer.

The relative resistance of fired tubes of stabilized zirconia to gas penetration is indicated as follows:

(1) Untreated and fired: $7.4 \times 10^{-5 (sq. cm.)/(min.)}$ (mm. of mercury)
(2) Treated with iron chloride and fired at about 1450° C. in air: $1.1 \times 10^{-5 (sq. cm.)/(min.)}$ (mm. of mercury)
(3) Treated with iron chloride and fired at about 1450° C. in $CO-CO_2$: about $1 \times 10^{-8 (sq. cm.)/(min.)}$ (mm. of mercury).

Testing procedure establishing the above values included the application of air of a known pressure to one side of the body of stabilized zirconia and the measurement of the air pressure collected on the other side thereof after a given period of exposure.

Penetration by gases through the solid oxygen material can be approximately by dampening one surface of the material being tested with a dilute sulphuric acid solution and measuring the electrical resistance from the outer to the inner surface in the region dampened. Before the iron chloride ($FeCl_2$) solution was applied and the coated material fired the resistance was about $10^3$ ohms. After treatment and firing as described in this invention, the resistance was about $10^7$ ohms. Repetition of the coating and firing procedure did not result in further reduction in porosity.

An example of another atmosphere is the use of argon/$CO_2$. The $CO_2$ content was about 2%, the body being densified was a nickel tube coated (by plasma spraying) with calcium oxide-stabilized zironia. Firing took place at about 1400° C. and lasted about 20 hours. The extent of reduction of porosity was measured by the electrical resistance method described above and the resistance was found to be about $10^7$ ohms as indicated therein.

Although the preferred range of firing time is from about 10–20 hours, shorter times will ordinarily suffice with higher firing temperatures, thus, measurable improvement in product densification may be had with as short a time as ½ hours at about 1400° C.

Although the preferred oxygen-ion electrolyte material to be used in the practice of this invention is solid stabilized zirconia, other solid oxygen-ion electrolyte materials, as for example, solid doped thoria, may satisfactorily be employed.

Solid doped thoria is also a solid oxygen-ion electrolyte material which consists of thoria to which is added calcium oxide, yttrium oxide, or a mixture of rare earth oxides. For example, an initial solid doped thoria material consists of thoria which is doped with the addition of four molecular percent calcium oxide to increase its conductivity.

Although it is convenient to construct and describe the construction of the oxygen-ion electrolyte component of a high temperature fuel cell as tubular in shape, numerous other shapes may be employed and the invention described herein may be used in conjunction therewith.

Other metals, for example, silver, lithiated nickel, cobalt and platinum may be employed as electrode materials in conjunction with the densified stabilized zirconia.

Various modifications are contemplated and may obviously be employed by those skilled in the art without departing from the invention as defined in the appended claims.

What I claim as new and desire to secure by Letters Patent of the United States is:

1. A process for the densification of a body of solid oxygen-ion material selected from the group consisting of stabilized zirconia and doped thoria comprising the steps of:
   (a) coting a major surface area of said body with iron chloride solution, and
   (b) heating said coated body to a temperature in excess of about 1300° C. for a period in excess of about one-half hour in a gaseous reducing atmosphere having a controlled oxygen partial pressure such that FeO is the only stable relationship for the iron produced by decomposition of the iron chloride.

2. The process for densification of a body of solid oxygen-ion material substantially as recited in claim 1, wherein the atmosphere is a mixture of carbon monoxide and carbon dioxide.

3. The process for densification of a body of solid oxygen-ion material substantially as recited in claim 1, wherein the atmosphere is a mixture of hydrogen and water vapor.

4. The process for densification of a body of solid oxygen-ion material substantially as recited in claim 1, wherein the atmosphere is a mixture of argon and carbon dioxide.

5. The process for the densification of a body of solid oxygen-ion material substantially as recited in claim 1, wherein the temperature employed is in the range of from about 1300° to 1400° C. and the oxygen-ion material is stabilized zirconia.

6. The process for the densification of a body of solid oxygen-ion material substantially as recited in claim 5 wherein the heating is continued for longer than about 10 hours.

7. The process for the densification of a body of solid oxygen-ion material substantially as recited in claim 5 wherein the stabilized zirconia being treated is deposited on a nickel surface.

References Cited

UNITED STATES PATENTS 3,404,039    10/1968    Mitoff _____ 136—86

ALFRED L. LEAVITT, Primary Examiner

W. E. BALL, Assistant Examiner

U.S. Cl. X.R.

117— 62, 69, 221, 230; 136—86